(12) United States Patent
Herriot et al.

(10) Patent No.: US 9,731,612 B2
(45) Date of Patent: Aug. 15, 2017

(54) ENERGY CONVERSION SYSTEM, RECHARGING ASSEMBLY BY INDUCTION AND METHODS FOR TRANSMITTING AND RECEIVING ASSOCIATED DATA

(71) Applicant: Schneider Electric Industries SAS, Rueil-Malmaison (FR)

(72) Inventors: Yann Herriot, Voiron (FR); Dimitrios Ladas, Grenoble (FR); Lionel Dorbais, Saint-Martin d'Heres (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 210 days.

(21) Appl. No.: 14/505,607

(22) Filed: Oct. 3, 2014

(65) Prior Publication Data
US 2015/0097522 A1 Apr. 9, 2015

(30) Foreign Application Priority Data
Oct. 9, 2013 (FR) ...................................... 13 59804

(51) Int. Cl.
*B60L 11/18* (2006.01)
*H02J 5/00* (2016.01)
(Continued)

(52) U.S. Cl.
CPC ......... *B60L 11/182* (2013.01); *B60L 11/1812* (2013.01); *H02J 5/005* (2013.01);
(Continued)

(58) Field of Classification Search
CPC  B60L 11/182; B60L 11/1812; B60L 2210/30; B60L 2210/40; H02J 7/0052;
(Continued)

(56) References Cited

U.S. PATENT DOCUMENTS 6,750,560 B1  6/2004 Nishimoto et al.
2005/0017673 A1  1/2005 Tsukamoto et al.
(Continued)

OTHER PUBLICATIONS

French Preliminary Search Report issued Aug. 12, 2014 in French Application 13 59804, filed on Oct. 9, 2013 ( with English Translation of Categories of Cited Documents).

*Primary Examiner* — Richard Isla Rodas
*Assistant Examiner* — Dung V Bui
(74) *Attorney, Agent, or Firm* — Oblon, McClelland, Maier & Neustadt, L.L.P.

(57) ABSTRACT

The energy conversion system comprises a primary and a secondary modules. The primary module includes input terminals, a primary winding, and a primary capacitor connected to the primary winding and the input terminals. The secondary module includes output terminals, a secondary winding and a secondary capacitor connected to the secondary winding and the output terminals. A current is induced in the secondary winding when the primary and secondary windings are magnetically coupled, the current received between the input terminals flowing through the primary winding.
The secondary module comprises a secondary switch electrically connected to the secondary capacitor and the secondary winding, and means for controlling the secondary switch, between a first configuration wherein the current induced in the secondary winding flows up to the output terminals, and a second configuration wherein said induced current flows in a closed loop through the secondary winding and the secondary capacitor.

10 Claims, 7 Drawing Sheets

(51) Int. Cl.
  *H04L 29/08* (2006.01)
  *H02J 7/00* (2006.01)
  *H02J 7/02* (2016.01)

(52) U.S. Cl.
  CPC ............ *H02J 7/0052* (2013.01); *H02J 7/025* (2013.01); *H04L 67/12* (2013.01); *B60L 2210/30* (2013.01); *B60L 2210/40* (2013.01); *Y02T 10/7005* (2013.01); *Y02T 10/7072* (2013.01); *Y02T 10/7241* (2013.01); *Y02T 90/122* (2013.01); *Y02T 90/127* (2013.01); *Y02T 90/14* (2013.01)

(58) Field of Classification Search
  CPC H02J 5/005; H02J 7/025; H04L 67/12; Y02T 10/7005; Y02T 10/7072; Y02T 10/7241; Y02T 90/122; Y02T 90/127; Y02T 90/14
  USPC ....................................................... 320/108
  See application file for complete search history.

(56) References Cited

U.S. PATENT DOCUMENTS

| | | |
|---|---|---|
| 2009/0284082 A1 | 11/2009 | Mohammadian |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2010/0001845 A1 | 1/2010 | Yamashita |
| 2010/0201202 A1 | 8/2010 | Kirby et al. |
| 2012/0161696 A1* | 6/2012 | Cook .................... B60L 11/182 320/108 |
| 2012/0313448 A1 | 12/2012 | Anttila |
| 2012/0326499 A1* | 12/2012 | Ichikawa .............. B60L 11/182 307/9.1 |
| 2013/0128638 A1* | 5/2013 | Irish .................... H02M 1/4266 363/126 |
| 2013/0134792 A1 | 5/2013 | Bunsen et al. |
| 2013/0188397 A1* | 7/2013 | Wu .................. H02M 3/33576 363/17 |
| 2013/0300358 A1 | 11/2013 | Kirby et al. |
| 2014/0103881 A1 | 4/2014 | Mohammadian et al. |
| 2015/0097522 A1* | 4/2015 | Herriot ................... H02J 7/025 320/108 |

* cited by examiner

ENERGY CONVERSION SYSTEM, RECHARGING ASSEMBLY BY INDUCTION AND METHODS FOR TRANSMITTING AND RECEIVING ASSOCIATED DATA

BACKGROUND OF THE INVENTION

The present invention relates to an electric energy conversion system, comprising a primary module and a secondary module. The primary module includes two input terminals capable of receiving electric current, a primary winding, and a primary capacitor connected to the primary winding and the input terminals. The secondary module includes two output terminals, a secondary winding, and a secondary capacitor connected to the secondary winding and the output terminals. A current can be induced in the secondary winding when the primary winding and the secondary winding are magnetically coupled, the current received between the input terminals flowing through the primary winding.

The invention also relates to a recharging assembly by induction for an electric battery, the assembly comprising a recharging device and an electric vehicle, the electric vehicle including the electric battery. The recharging assembly comprises such an energy conversion system, the recharging device including the primary module, the electric vehicle including the secondary module, the input terminals being able to be connected to an electricity source and the output terminals being able to be connected to the electric battery.

The invention also relates to a method for transmitting data and a method for receiving data within such an induction recharging assembly for an electric battery.

Known from document US 2010/0190436 A1 is an electric energy conversion system and a recharging assembly of the aforementioned type. The primary module is connected to an electric grid, and the secondary module is connected to the electric battery. The electric battery is able to be recharged when the primary winding and the secondary winding are magnetically coupled, for example when the primary module is integrated into the roadway and the electric vehicle including the secondary module is situated above the primary module. Before beginning recharging of the electric battery, it is also necessary to pair the primary module with the secondary module, i.e., to allow the primary module to detect the presence of the secondary module, and conversely to allow the secondary module to detect the presence of the primary module. That pairing is done using two additional wireless communication modules capable of communicating with each other, a first additional module being connected to the primary module and a second additional module being connected to the secondary module.

However, such additional wireless communication modules are expensive and also increase the bulk of such an induction recharging assembly.

BRIEF SUMMARY OF THE INVENTION

The aim of the invention is therefore to propose an electric energy conversion system, as well as an associated induction recharging assembly, that are less expensive and less bulky.

To that end, the invention relates to an electric energy conversion system of the aforementioned type, in which the secondary module further comprises a secondary switch electrically connected to the secondary capacitor and to the secondary winding, and means for controlling the secondary switch, the secondary switch being able to switch, reversibly, between a first configuration in which the current induced in the secondary winding is able to flow up to the output terminals, and a second configuration in which said induced current is able to flow in a closed loop through the secondary winding and the secondary capacitor without being delivered to the output terminals.

Owing to the addition of the secondary switch according to the invention, which can reversibly switch between a first configuration, in which the current induced in the secondary winding is able to flow up to the output terminals, and a second configuration, in which said induced current is able to flow in the closed loop through the secondary winding and the secondary capacitor without being delivered to the output terminals, it is possible pair the primary module with the secondary module without additional wireless communication modules. In fact, as will be described in more detail below, the second configuration makes it possible to perform that pairing, while the first configuration allows the recharging of the electric battery.

According to other advantageous aspect of the invention, the electric energy conversion system comprises one or more of the following features, considered alone or according to any technically possible combinations:

- the secondary switch is connected in parallel with the secondary winding and the secondary capacitor connected in series on the one hand, and with the output terminals on the other hand;
- the secondary switch is connected in series between one of the output terminals and one end of the secondary winding, the secondary capacitor being connected in parallel with the secondary winding on the one hand, and with the output terminals on the other hand;
- the conversion system is reversible, a current being able to be induced in the primary winding when the primary winding and the secondary winding are magnetically coupled and a current received between the output terminals flows through the secondary winding, and the primary module further comprises a primary switch electrically connected to the primary capacitor and to the primary winding, and means for controlling the primary switch, the primary switch being able to switch, reversibly, between a third configuration, in which the current induced in the primary winding is able to flow up to the input terminals, and a fourth configuration, in which said induced current is able to flow in a closed loop through the primary winding and the primary capacitor without being delivered to the input terminals;
- the primary switch is connected in parallel with primary winding and the primary capacitor connected in series on the one hand, and with the input terminals on the other hand;
- the primary switch is connected in series between one of the input terminals and one end of the primary winding, the primary capacitor being connected in parallel with the primary winding on the one hand, and with the input terminals on the other hand; and
- the conversion system is able to convert one direct energy into another direct energy, the primary module including an inverter connected between the input terminals and the primary winding, and the secondary module including a rectifier connected between the secondary winding and the output terminals.

The invention also relates to an induction recharging assembly for an electric battery, the assembly comprising a device for recharging an electric vehicle by induction, the electric vehicle including the electric battery, wherein the assembly comprises an energy conversion system as defined above, the induction recharging device including the primary module, the electric vehicle including the secondary module, the input terminals being able to be connected to an electricity source and the output terminals being able to be connected to the electric battery.

The invention also relates to a method for transmitting data via a transmission module to a receiving module, within an induction recharging assembly for an electric battery, the assembly being as defined above, the method comprising the following steps, carried out by the transmission module chosen from among the primary module and the secondary module:
- controlling the switch of the receiving module among the secondary switch and the primary switch, in the corresponding configuration from among the second configuration and the fourth configuration,
- detecting an electric signal induced in the winding of the transmission module following the generation of at least one electric pulse between the terminals of the receiving module, the receiving module corresponding to the other module among the primary module and the secondary module, said induced signal flowing in the closed loop through the winding and the capacitor of the transmission module.

The invention also relates to a method for a receiving module to receive data from a transmitting module, within an induction recharging assembly for an electric battery, the assembly being as defined above, the method comprising the following steps, carried out by the receiving module chosen from among the primary module and the secondary module:
- generating at least one electric pulse between the terminals of the receiving module, and
- performing a frequency analysis of an electric signal flowing through the winding of the receiving module following the pulse generated between the terminals of the receiving module, in order to determine the configuration of the switch from among the secondary switch and the primary switch of the transmission module, the transmission module corresponding to the other module among the primary module and the secondary module.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF PREFERRED EMBODIMENTS

In the following of the description, the expression "substantially equal to" is to be understood as a relationship of equality to within plus or minus 5%.

Figure 1:
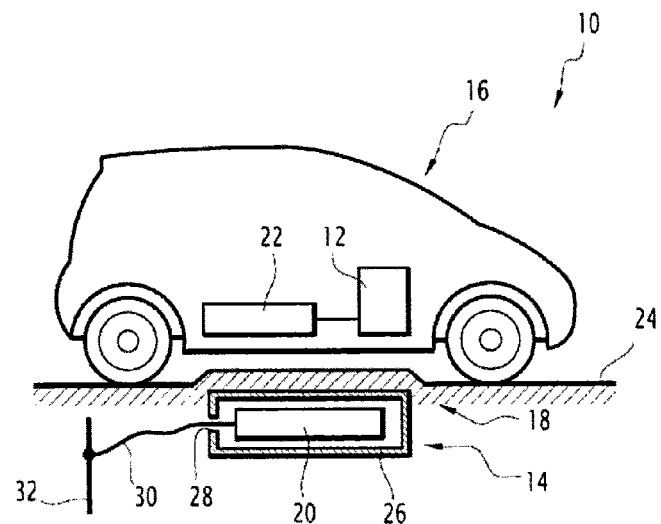
FIG. 1 is a diagrammatic illustration of an assembly for recharging an electric battery, the assembly comprising a recharging device, an electric vehicle and an electric energy conversion system, the electric vehicle including the electric battery.

In FIG. 1, an induction recharging assembly 10 for an electric battery 12 comprises an induction recharging device 14 and an electric vehicle 16.

The induction recharging assembly 10 comprises an electric energy conversion system 18, including a primary module 20 and a secondary module 22, the primary module 20 being comprised in the induction recharging device 14 and the secondary module 22 being comprised in the electric vehicle 16.

The battery 12 is known in itself. The battery 12 is for example a lithium battery, preferably a lithium-ion battery. Alternatively, the battery 12 is a nickel-sodium chloride battery, of the ZEBRA (Zero Emission Battery Research Activities) type.

The induction recharging device 14 is preferably designed to be arranged in the roadway 24. The recharging device 14 comprises the primary module 20 and a protective housing 26 inside which the primary module 20 is arranged. The protective housing 26 includes an orifice 28 for the passage of the electrical connection 30 connecting the primary module 20 to an electric grid 32.

The electric vehicle 16 is known in itself, and comprises the electric battery 12 and the secondary module 22, the secondary module 22 being electrically connected to the battery 12. The electric vehicle 16 is designed to be positioned above the recharging device 14 in order to recharge the battery 12, as shown in FIG. 1.

The electric energy conversion system 18 is capable of converting one electric energy into another electric energy. It can be connected to the electric grid 32 on the one hand, and the electric battery 12 on the other hand.

The conversion system 18 is then suitable for converting the electric energy from the grid 32 into in another electric energy delivered to the battery 12, or reversibly, to convert electric energy from the battery 12 into another electric energy provided to the grid 32.

The conversion system 18 is preferably able to convert one direct energy into another direct energy, the network 32 then being a direct network.

Figure 2:
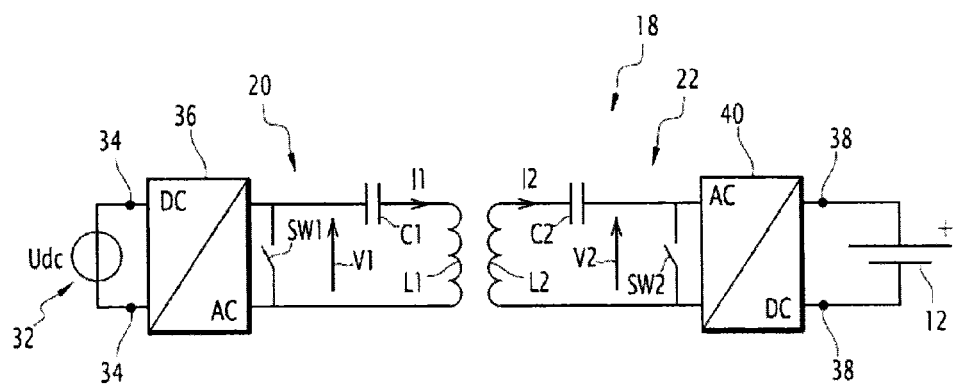
FIG. 2 is an electrical diagram of the electric energy conversion system of FIG. 1, according to a first embodiment of the invention, the conversion system comprising a primary module and a secondary module, the secondary module including a secondary switch capable of switching, reversibly, between a first configuration in which a current induced in the secondary winding is able to flow up to the output terminals of the conversion system, and a second configuration in which the induced current is capable of flowing in a closed loop through the secondary winding and a secondary capacitor without being delivered to the output terminals.

The primary module 20 comprises two input terminals 34 able to receive electric current, a primary winding L1 and primary capacitor C1 connected to the primary winding L1 and the input terminals 34, as shown in FIG. 2.

When the conversion system 18 is suitable for receiving a direct energy between the input terminals 34, the primary module 20 includes an inverter 36 connected between the input terminals 34 and the primary winding L1.

In a complementary manner, the primary module 20 further comprises a primary switch SW1 electrically connected to the primary capacitor C1 and the primary winding L1, and means (not shown) for commanding the primary switch SW1. The primary switch SW1 is a controllable switch known in itself. The primary switch SW1 is for example made from at least one transistor, such as a MOSFET transistor (metal oxide semiconductor field effect transistor) or an IGBT transistor (insulated gate bipolar transistor). Alternatively, the primary switch SW1 is formed by at least one thyristor.

The secondary module 22 comprises two output terminals 38, a secondary winding L2 and a secondary capacitor C2 connected to the secondary winding L2 and the output terminals 38.

When the conversion system 18 is suitable for delivering direct energy between the output terminals 38, the secondary module 22 includes a rectifier 40 connected between the secondary winding L2 and the output terminals 38.

A current I2 can be induced in the secondary winding L2 when the primary winding L1 and the secondary winding L2 are magnetically coupled, for example when the electric vehicle 16 is positioned above the recharging device 14, the current received between the input terminals 38 flowing through the primary winding L1.

According to the invention, the secondary module 22 further comprises a secondary SW2 electrically connected to the secondary capacitor C2 and the secondary winding L2, and means (not shown) for controlling the secondary switch SW2. The secondary switch SW2 is a controllable switch known in itself. The secondary switch SW2 is for example made from at least one transistor, such as a MOSFET transistor or an IGBT transistor. Alternatively, the secondary switch SW2 is formed from at least one thyristor.

The secondary switch SW2 is able to switch, reversibly, between a first configuration in which the current I2 induced in the secondary winding L2 is able to flow as far as the output terminals 38, and a second configuration in which said induced current I2 is able to flow in the closed loop through the secondary winding L2 and the secondary capacitor C2 without being delivered across the output terminals 38.

In a complementary manner, a current I1 can be induced in the primary winding L1 when the primary winding L1 and the secondary winding L2 are magnetically coupled and a current received between the output terminals 38 flows through the secondary winding L2.

The primary switch SW1 is then able to switch, reversibly, between a third configuration in which the current I1 induced in the primary winding L1 is able to flow up to the input terminals 34, and a fourth configuration in which said induced current I1 is able to flow in the closed loop through the primary winding L1 and the primary capacitor C1 without being delivered to the input terminals 34.

The input terminals 34 can be connected to a power supply source, such as the grid 32, and the output terminals 38 can be connected to the electric battery 12.

In the example embodiment of FIG. 2 where the grid 32 forms a voltage source, the primary switch SW1 is connected in parallel with the primary winding L1 and the primary capacitor C1 that are connected in series on the one hand, and with the input terminals 34 on the other hand.

When the grid 32 forms a direct voltage source able to deliver a direct voltage denoted Udc, the primary switch SW1 is connected in parallel with the inverter 36 on the side of the inverter opposite the side connected to the input terminals 34.

In the example embodiment of FIG. 2 where the charge, i.e., the battery 12, is supplied with voltage, the secondary switch SW2 is connected in parallel with the secondary winding L2 and the secondary capacitor C2 that are connected in series on the one hand, and with the output terminals 38 on the other hand.

When the charge is supplied with direct voltage, the secondary switch SW2 is connected in parallel with the rectifier 40 on the side of the rectifier opposite the side connected to the output terminals 38.

In the example embodiment of FIG. 2, the first configuration corresponds to the open position of the secondary switch SW2, and the second configuration corresponds to the closed position of the secondary SW2.

In the example embodiment of FIG. 2, the third configuration corresponds to the open position of the primary switch SW1, and the fourth configuration corresponds to the closed position of the primary switch SW1.

According to this first embodiment, the conversion system 18 has an arrangement called serial-serial, the primary C1 and secondary C2 capacitors being connected in series with the primary winding L1 and the secondary winding L2, respectively.

Figure 3:
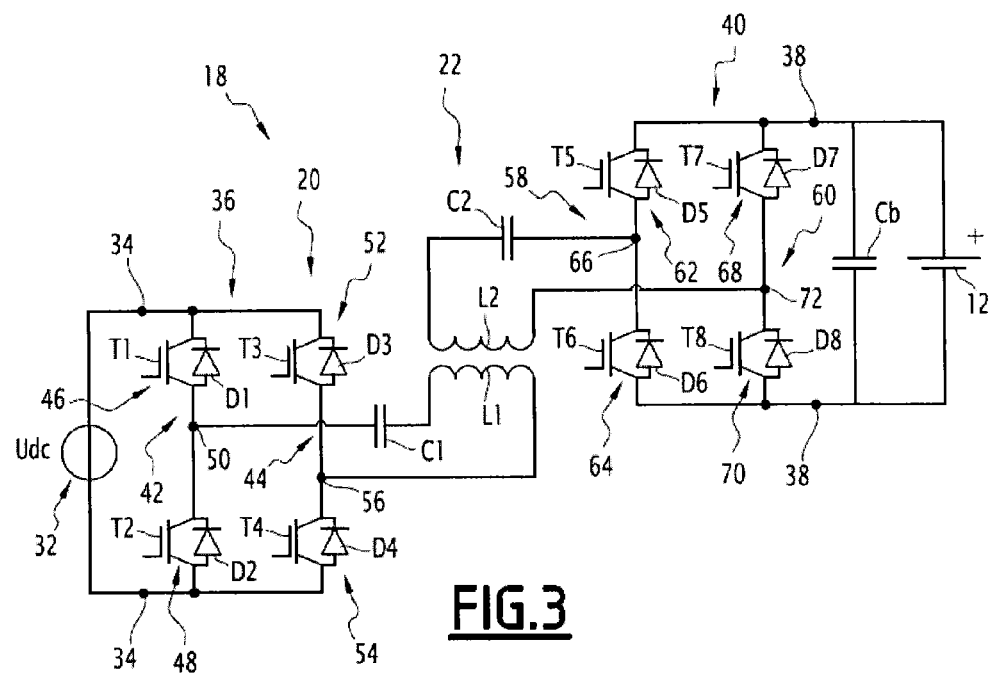
FIG. 3 is a more detailed electrical diagram of the conversion system of FIG. 2.

In FIG. 3, which shows a detailed electrical diagram of the conversion system 18, in a serial-serial arrangement identical to that of FIG. 2, the inverter 36 and the rectifier 40 each include an H bridge, as is known in itself.

The inverter 36 includes a first switching branch 42 and a second switching bridge 44, connected in parallel to each other and between the input terminals 34, the first switching branch 42 including a first switch 46 and a second switch 48 that are connected in series between the input terminals 34 and connected to each other by a first midpoint 50, and the second switching branch 44 including a third switch 52 and a fourth switch 54 connected in series between the input terminals 34 and connected to each other by a second midpoint 56.

The primary capacitor C1 and the primary winding L1 are then connected in series between the first midpoint 50 and the second midpoint 56.

The rectifier 40 includes a third switching branch 58 and a fourth switching branch 60, connected to each other in parallel and between the output terminals 38, the third switching branch 50 including a fifth switch 62 and a sixth switch 64 connected in series between the output terminals 38 and connected to each other by a third midpoint 66, the fourth switching branch 60 including a seventh switch 68 and an eighth switch 70 connected in series between the output terminals 38 and connected to each other by a fourth midpoint 72.

The secondary capacitor C2 and the secondary winding L2 are then connected in series between the third midpoint 66 and the fourth midpoint 72.

The first 46, second 48, third 52, fourth 54, fifth 62, sixth 64, seventh 68 and eighth 70 switches are, for example, each formed by a transistor Ti and a diode Di connected in antiparallel with the transistor Ti, where i is an integer index comprised between 1 and 8 and corresponding to the number of the respective switch.

In the example embodiment of FIG. 3, the primary switch SW1 is formed by the switches 46, 48, 52, 54 of the inverter 36, the closing of the primary switch SW1 is obtained by closing the second switches 48, 54 and/or by closing the first and third switches 46, 52. The opening of the primary switch SW1 is obtained by opening all of the switches 46, 48, 52, 54 of the inverter 36.

Similarly, in the example embodiment of FIG. 3, the secondary switch SW2 is formed by the switches 62, 64, 68, 70 of the rectifier 40. The closing of the secondary switch SW2 is obtained by closing the sixth and eighth switches 64, 70 and/or by closing the fifth and seventh switches 62, 68. The opening of the secondary switch SW2 is obtained by opening all of the switches 62, 64, 68, 70 of the rectifier 40.

The inverter 36 and/or the rectifier 40 as described in the example embodiment of FIG. 3 makes it possible to offer a reversibility in the flow of current in the primary module 20 and/or in the secondary module 22, while saving on components, the primary switch SW1 and/or the secondary switch SW2 being formed by the switches of the inverter 36 and/or the rectifier 40, not requiring an additional switching component.

The operation of the induction recharging assembly 10 according to the invention, and more particularly the energy conversion system 18, will now be described using the flowchart of FIG. 4 and the different curves shown in FIGS. 5 to 8.

When the conversion system 18 according to the invention comprises only the secondary switch SW2, and the primary module 20 does not include a primary switch connected to the primary capacitor C1 and the primary winding L1, the conversion system 18 allows the primary module 20 to detect the presence or absence of the secondary module 22, and allows the secondary module 22 to transmit data to the primary module 20. The secondary module 22 is then called transmitting module, and the primary module 20 is called the receiving module.

In a complementary matter, when the conversion system 18 according to the invention comprises both the primary switch SW1 and the secondary switch SW2, the conversion system 18 allows each module 20, 22 to detect the presence or absence of the other module 22, 20. More generally, the conversion system 18 allows the transmission of data by a transmission module chosen from among the primary module 20 and the secondary module 22 and a receiving module corresponding to the other module from among the primary module 20 and the secondary module 22. In other words, the conversion system 18 allows an exchange of data in a first direction, from the primary module 20 to the secondary module 22, or in a second direction opposite the first direction, from the secondary module 22 to the primary module 20.

Figure 4:
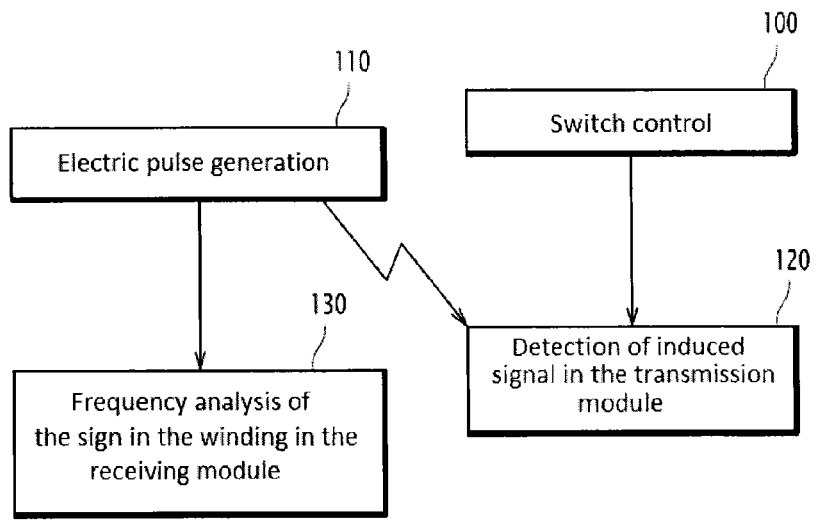
FIG. 4 is a flowchart of the data transmission and reception methods according to the invention.

During the initial step 100, shown in FIG. 4, the transmission module commands a switch among the secondary switch SW2 and the primary switch SW1 into the corresponding configuration from among the second configuration and the fourth configuration, such that a signal induced in the winding from among the secondary winding L2 and the primary winding L1 of the transmission module will flow in a closed loop through said winding and the capacitor of the transmission module.

During the following step 110, the receiving module generates an electric pulse through its winding from among the primary winding L1 and the secondary winding L2, and that electric pulse then creates an electric signal induced in the winding of the transmission module.

The transmission module then detects the electric signal induced in its winding during step 120, said induced signal flowing in the closed loop through the winding and the capacitor of the transmission module through the positioning of the switch of the transmission module among the secondary switch SW2 and the primary switch SW1 in the corresponding configuration among the second configuration and the fourth configuration.

During step 130, the receiving module then performs a frequency analysis of the electric signal flowing through its winding in order to determine the configuration of the switch of the transmission module from among the secondary switch SW2 and the primary switch SW1. The receiving module then determines the data transmitted by the transmission module based on the spectral density of the electric signal flowing through its winding.

Figure 5:
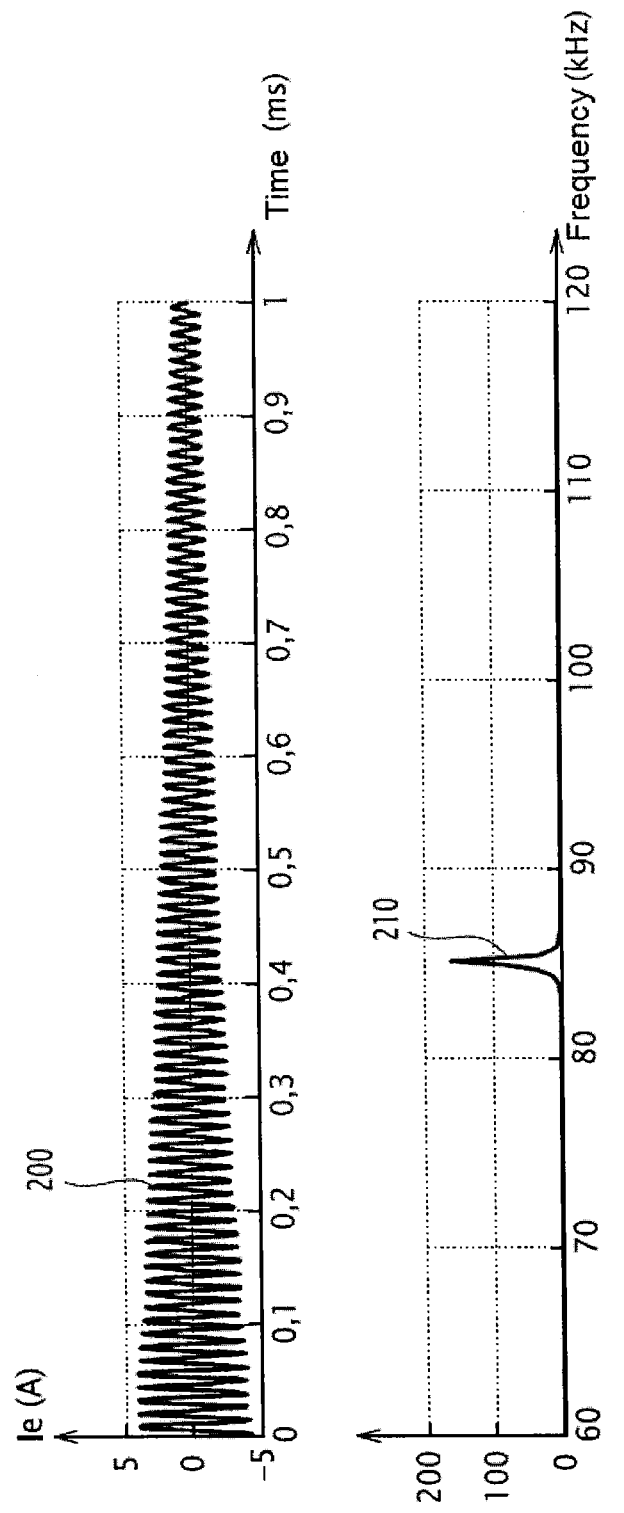
FIG. 5 is a set of curves showing the intensity of the current flowing in the primary module, and the associated spectral density, when the secondary switch of FIG. 2 is in its first configuration.

In FIG. 5, a curve 200 shows the intensity of the current flowing through the winding of the receiving module from among the primary winding L1 and the secondary winding L2, such as the primary winding L1 of the primary module 20, and a curve 210 shows the spectral density of that intensity, when the transmission module, such as the secondary module 22, is not magnetically coupled with the receiving module or the switch of the transmission module from among the secondary switch SW2 and the primary switch SW1 is in the corresponding configuration from among the first configuration and the third configuration. The curve 200 then shows that the intensity of the current flowing through the winding of the receiving module decreases over time, and the current has a single resonance frequency substantially equal to 85 kHz, as shown by curve 210.

Figure 6:
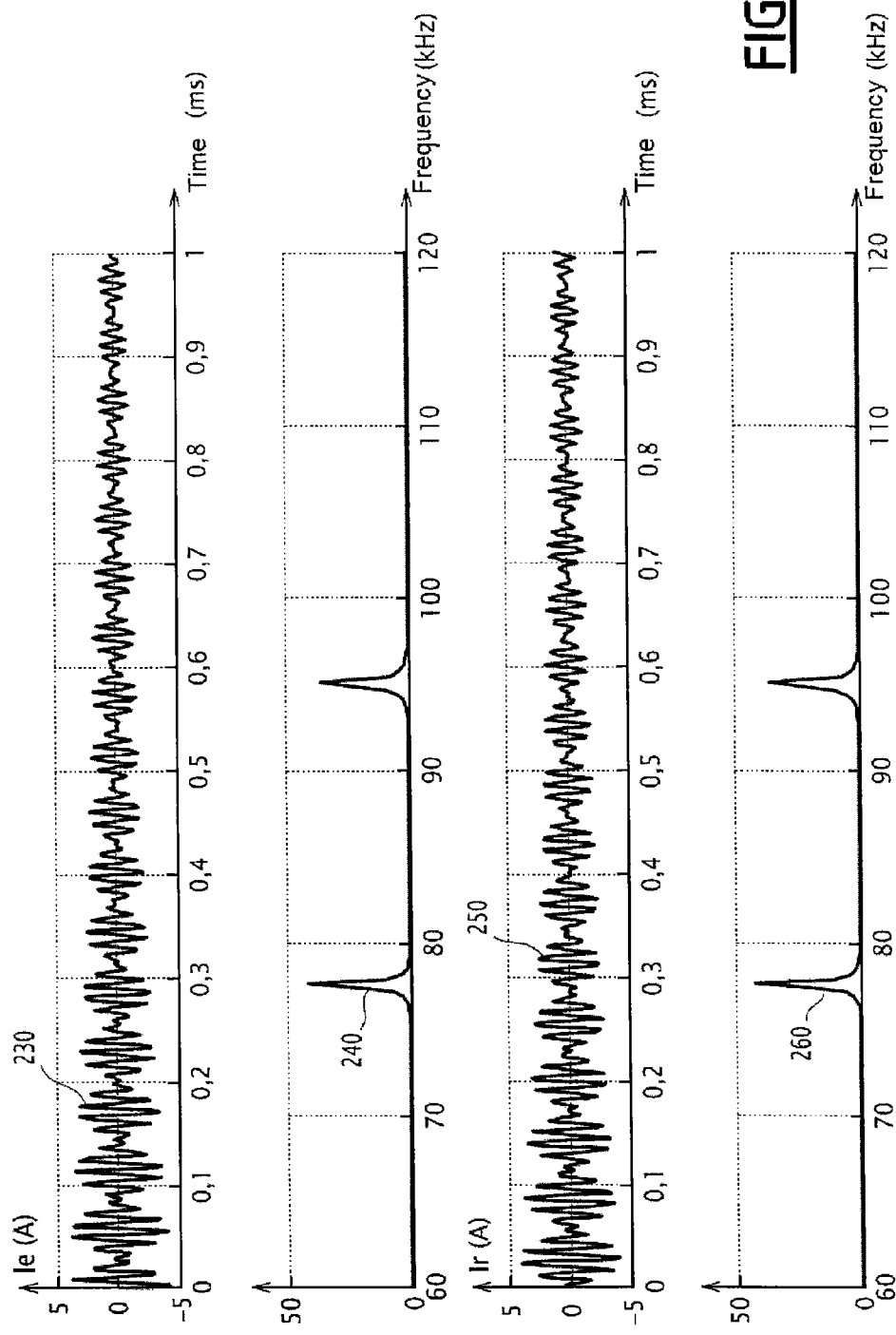
FIG. 6 is a set of curves showing the intensity of the current flowing in the primary module and the associated spectral density, as well as the intensity of a current flowing in the secondary module and the associated spectral density, when the secondary switch of FIG. 2 is in its second configuration.

In FIG. 6, a curve 230 shows the intensity of the current flowing through the winding of the receiving module, and a curve 240 shows the spectral density of that intensity, when the transmission module is magnetically coupled with the receiving module and the switch of the transmission module is in the corresponding configuration from among the second configuration and the fourth configuration. A curve 250 shows the intensity of the current flowing through the winding of the transmission module, and a curve 260 shows the spectral density of that intensity. The curves 230 and 250 show that the amplitudes of these currents oscillate more over time, and that these currents each have two resonance frequencies substantially equal to 78 kHz and 95 kHz, as respectively shown by curves 240 and 260.

Thus, when the transmission module has positioned its switch from among the secondary switch SW2 and the primary switch SW1 in the appropriate configuration from among the second configuration and the fourth configuration, that difference relative to the number of resonance frequencies allows the receiving module to detect the presence of the transmission module that is magnetically coupled to the receiving module.

Figure 7:
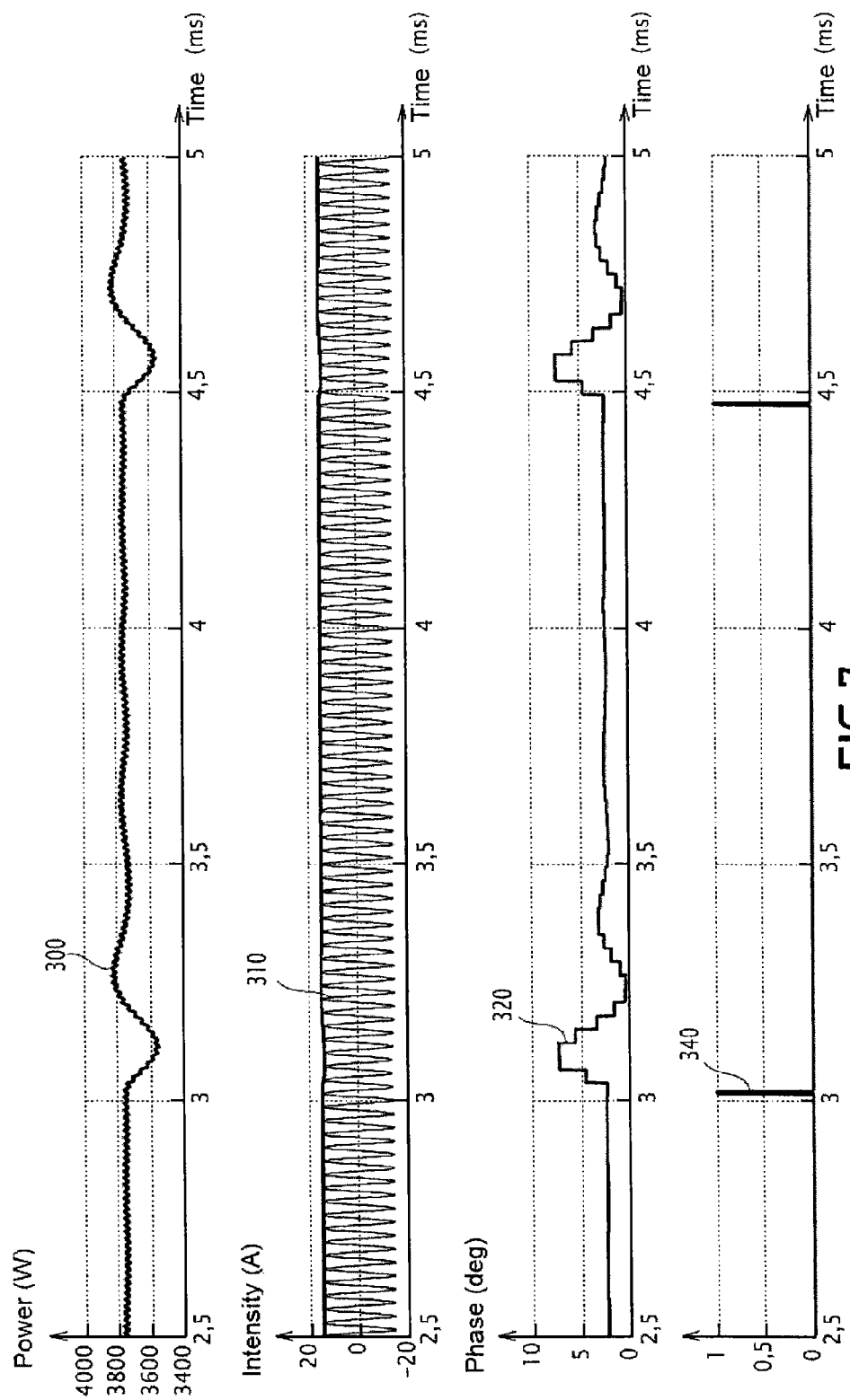
FIG. 7 is a set of curves showing the power, intensity and phase of the current flowing in the primary module, as well as a control signal for the secondary switch, during a data transmission from the secondary module to the primary module.

In FIG. 7, curves 300, 310 and 320 respectively show the power, intensity and phase of the current flowing in the receiving module, and a curve 330 shows a control signal of the switch of the transmission module from among the secondary switch SW2 and the primary switch SW1, during a data transmission from the transmission module to the receiving module. The control signal of the switch has a level equal to 1 in order to command the switch of the transmission module into the corresponding configuration from among the second configuration and the fourth configuration, and a level equal to 0 to command said switch into the corresponding configuration from among the first configuration and the third configuration.

In order to transmit data to the receiving module, the control signal of the switch of the transmission module then has a pulse varying from 0 to 1, and that pulse is easily detectable by the receiving model, since it creates a short-term disruption of the power, amplitude and phase of the current flowing in the winding of the receiving module, as shown in FIG. 7 for curves 300, 310 and 320 after each of the two pulses visible on curve 340.

The conversion system 18 according to the invention then makes it possible to send data from the transmission module, including the corresponding switch from among the secondary switch SW2 and the primary switch SW1, to the receiving module without disrupting the charge of the electric battery 12, as shown by curves 300, 310, and 320 of FIG. 7.

Figure 8:
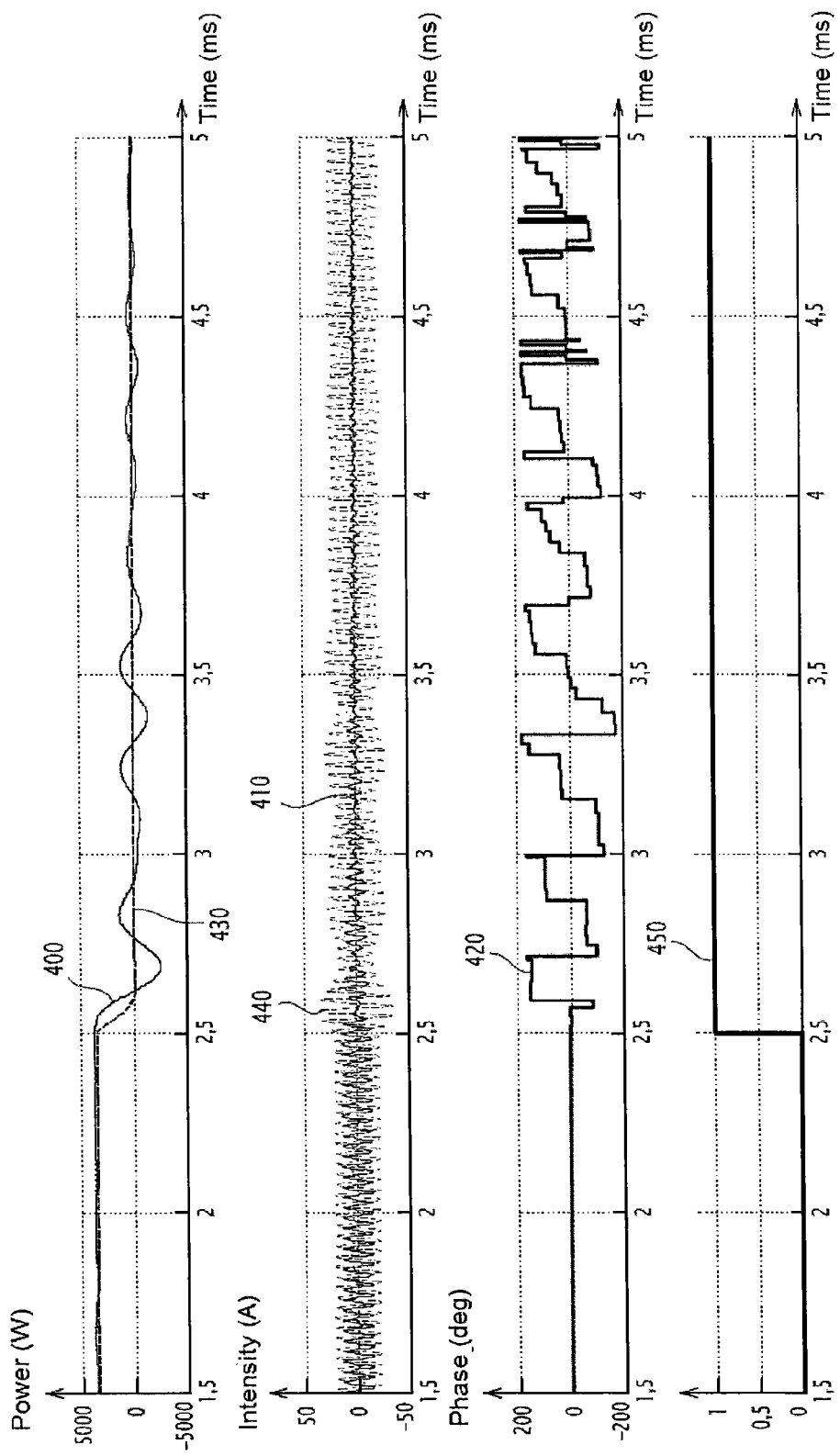
FIG. 8 is a set of curves showing the power, intensity and phase of the current flowing in the primary module, the power and the intensity of the current flowing in the secondary module, as well as the control signal of the secondary switch, during an emergency stop of the recharging the electric battery, upon request from the secondary module.

In FIG. 8, curves 400, 410 and 420 respectively show the power, intensity and phase of the current flowing in the receiving module, and curves 430 and 440 respectively show the power and intensity of the current flowing in the transmission module. Lastly, a curve 450 shows the control signal of the switch of the transmission module, such as the secondary switch SW2, during a transmission of data from the transmission module to the receiving module, in particular during a request for an emergency stop from the secondary module 22 connected to the battery 12. For an emergency stop request, the control signal of the switch does not include a pulse varying from 0 to 1, then again at 0, has a plateau equal to 1 to command the switch of the transmission module into the corresponding configuration from among the second configuration and the fourth configuration, such as the second configuration, once the emergency stop is requested.

The emergency stop request is thus a particular transmission of a datum intended for the receiving module, the control signal of the switch of the transmission module then has a plateau at 1, and that plateau is easily detectable by the receiving module, since it creates an intensity drop and significant disruptions on the phase, as shown in FIG. 8 for curves 410 and 420 after the beginning of the plateau at 1 shown on curve 450.

The conversion system 18 according to the invention then makes it possible, for the secondary module 22 connected to the battery 12, to request an emergency stop of the charging of the battery 12 from the primary module 20.

Figure 9:
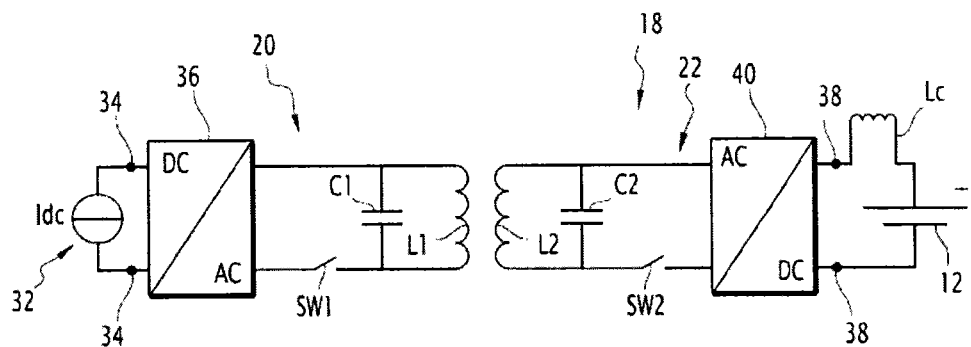
FIGS. 9 to 11 are views similar to that of FIG. 2, according to second, third and fourth embodiments, respectively, of the invention.

FIG. 9 illustrates a second embodiment of the invention for which elements identical to the first embodiment, previously described, are identified using identical references.

According to this second embodiment, the primary module 20 is powered by a current source, the grid 32 being able to deliver a current, such as a direct current Idc, and the charge is also supplied with current, an electric coil Lc being connected in series with the battery 12.

According to this second embodiment, the conversion system 18 then has an arrangement called parallel-parallel, the primary C1 and secondary C2 capacitors being connected in parallel with the primary winding L1 and the secondary winding L2.

The secondary switch SW2 is then connected in series between one of the output terminals 38 and one end of the secondary winding L2, the secondary capacitor C2 being connected in parallel with secondary winding L2 on the one hand, and the output terminals 38 on the other hand.

In a complementary manner, the primary switch SW1 is connected in series between one of the terminals 34 and one end of the primary winding L1, the primary capacitor C1 being active in parallel with the primary winding L1 on the one hand, and with the input terminals 34 on the other hand.

The operation of the second embodiment is identical to that of the first embodiment previously described, and is not described again, a current calibration applied between the input terminals 34 of the parallel-parallel arrangement of the second embodiment being equivalent to a voltage calibration applied between the input terminals 34 of the serial-serial arrangement of the first embodiment.

The advantages of the second embodiment are identical to those of the first embodiment, described previously, and are not described again.

Figure 10:
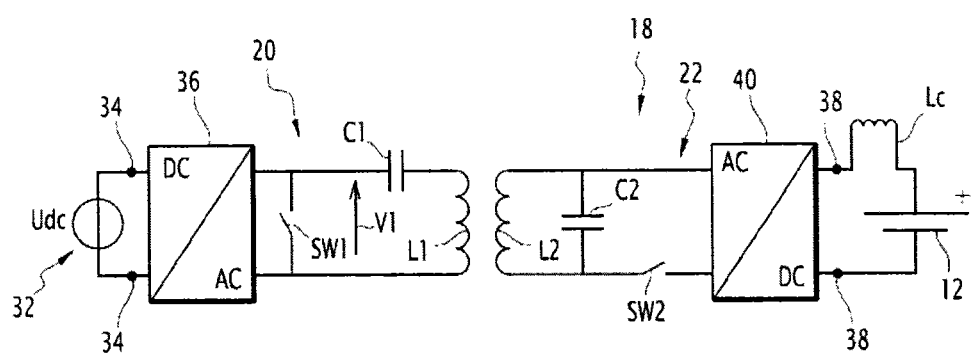

FIG. 10 illustrates a third embodiment of the invention for which the elements identical to the first embodiment, previously described, are identified using identical references.

According to this third embodiment, the primary module 20 is supplied by a voltage source, and the charge is supplied with current, an electromagnetic coil Lc being connected in series with the battery 12.

According to this third embodiment, the conversion system 18 then has a so-called serial-parallel arrangement, the primary capacitor C1 being connected in series with the primary winding L1 and the secondary capacitor C2 being connected in parallel with the secondary winding L2.

The secondary switch SW2 is then connected in series between one of the output terminals 38 and one end of the secondary winding L2, the secondary capacitor C2 being connected in parallel with secondary winding L2 on the one hand, and the output terminals 38 on the other hand.

In a complementary manner, the primary switch SW1 is connected in parallel with the primary winding L1 and the primary capacitor C1 that are connected in series on the one hand, and with the input terminals 34 on the other hand.

The operation of this third embodiment is identical to that of the first embodiment previously described, and is not described again.

The advantages of this third embodiment are identical to those of the first embodiment previously described, and are not described again.

Figure 11:
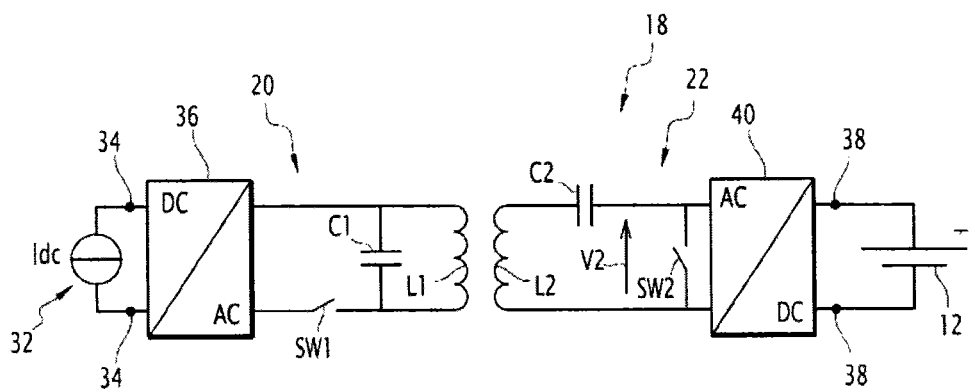

FIG. 11 illustrates a fourth embodiment of the invention for which the elements identical to the first embodiment, previously described, are identified using identical references.

According to the fourth embodiment, the primary module 20 is supplied by a current source, and the charge is supplied with voltage.

According to the fourth embodiment, the conversion system 18 then has a so-called parallel-serial arrangement, the primary capacitor C1 being connected in parallel with the primary winding L1 and the secondary capacitor C2 being connected in series with the secondary winding L2.

The secondary switch SW2 is connected in parallel with the secondary winding L2 and the secondary capacitor C2 that are connected in series on the one hand, and with the output terminals 38 on the other hand.

In a complementary manner, the primary switch SW1 is connected in series between one of the input terminals 34 and one end of the primary winding L1, the primary capacitor C1 being connected in parallel with the primary winding L1 on the one hand, and with the input terminals 34 on the other hand.

The operation of this fourth embodiment is identical to that of the first embodiment previously described, and is therefore not described again.

The advantages of the fourth embodiment are identical to those of the first embodiment previously described, and are not described again.

One can thus see that the energy conversion system 18 according to the invention, as well as the associated assembly for recharging by induction 10, are less expensive and less bulky than the energy conversion system and the recharging assembly of the state of the art, since they make it possible to pair the primary module 2 with the secondary module 22, and more generally to exchange data between the primary module 20 and the secondary module 22, without requiring additional wireless communication modules.

The invention claimed is:

1. An electric energy conversion system, comprising a primary module and a secondary module,
the primary module including two input terminals capable of receiving an electric current, a primary winding, and a primary capacitor connected to the primary winding and the input terminals,
the secondary module including two output terminals, a secondary winding, and a secondary capacitor connected to the secondary winding and the output terminals,
the primary winding being configured to induce a current in the secondary winding when the primary winding and the secondary winding are magnetically coupled and a current is received between the input terminals of the primary winding, wherein
the secondary module further comprises a secondary switch electrically connected to the secondary capacitor and to the secondary winding, and circuitry configured to control the secondary switch, the secondary switch being able to switch, reversibly, between a first configuration in which the current induced in the secondary winding flows to the output terminals, and a second configuration in which said induced current flows in a closed loop through the secondary winding and the secondary capacitor without being delivered to the output terminals,
when the primary module generates an electric pulse through the primary winding while the secondary switch is in the second configuration, the primary module is configured to detect presence of the secondary module by detecting a number of resonance frequencies of a current flowing in the primary winding.

2. The conversion system according to claim 1, wherein the secondary switch is connected in parallel with the secondary winding and the secondary capacitor connected in series on the one hand, and with the output terminals on the other hand.

3. The conversion system according to claim 1, wherein the secondary switch is connected in series between one of the output terminals and one end of the secondary winding, the secondary capacitor being connected in parallel with the secondary winding on the one hand, and with the output terminals on the other hand.

4. The conversion system according to claim 1, wherein the conversion system is reversible, the secondary winding being configured to induce a current in the primary winding when the primary winding and the secondary winding are magnetically coupled and a current received between the output terminals flows through the secondary winding,
wherein the primary module further comprises a primary switch electrically connected to the primary capacitor and to the primary winding, and circuitry configured to control the primary switch, the primary switch being able to switch, reversibly, between a third configuration, in which the current induced in the primary winding flows to the input terminals, and a fourth configuration, in which said induced current flows in a closed loop through the primary winding and the primary capacitor without being delivered to the input terminals.

5. The conversion system according to claim 4, wherein the primary switch is connected in parallel with the primary winding and the primary capacitor connected in series on the one hand, and with the input terminals on the other hand.

6. The conversion system according to claim 4, wherein the primary switch is connected in series between one of the input terminals and one end of the primary winding, the primary capacitor being connected in parallel with the primary winding on the one hand, and with the input terminals on the other hand.

7. The conversion system according to claim 1, wherein the conversion system is configured to convert one direct energy into another direct energy,
wherein the primary module includes an inverter connected between the input terminals and the primary winding, and
the secondary module including a rectifier connected between the secondary winding and the output terminals.

8. An induction recharging assembly for an electric battery, the assembly comprising an induction recharging device for recharging by induction and an electric vehicle, the electric vehicle including the electric battery,
wherein the induction recharging assembly comprises an energy conversion system according to claim 4, the induction recharging device including the primary module, the electric vehicle including the secondary module, the input terminals being connectable to an electricity source and the output terminals being connectable to the electric battery.

9. A method for transmitting data via a transmission module to a receiving module, within an induction recharging assembly for an electric battery, the assembly including a primary module and a secondary module,
the primary module including two input terminals capable of receiving an electric current, a primary winding, and a primary capacitor connected to the primary winding and the input terminals,
the secondary module including two output terminals, a secondary winding, and a secondary capacitor connected to the secondary winding and the output terminals,
the primary winding being configured to induce a current in the secondary winding when the primary winding and the secondary winding are magnetically coupled and a current is received between the input terminals of the primary winding, wherein
the secondary module further comprises a secondary switch electrically connected to the secondary capacitor and to the secondary winding, and circuitry configured to control the secondary switch, the secondary switch being able to switch, reversibly, between a first configuration in which the current induced in the secondary winding flows to the output terminals, and a second configuration in which said induced current flows in a closed loop through the secondary winding and the secondary capacitor without being delivered to the output terminals, wherein the primary module further comprises a primary switch electrically connected to the primary capacitor and to the primary winding, and circuitry configured to control the primary switch, the primary switch being able to switch, reversibly, between a third configuration, in which the current induced in the primary winding flows to the input terminals, and a fourth configuration, in which said induced current flows in a closed loop through the primary winding and the primary capacitor without being delivered to the input terminals, wherein the method is carried out by the transmission module chosen from among the primary module and the secondary module and comprises:

controlling the switch of the receiving module among the secondary switch and the primary switch, in the corresponding configuration from among the second configuration and the fourth configuration, detecting an electric signal induced in the winding of the transmission module following the generation of at least one electric pulse between the terminals of the receiving module, the receiving module corresponding to the other module among the primary module and the secondary module, said induced signal flowing in the closed loop through the winding and the capacitor of the transmission module.

10. A method for a receiving module to receive data from a transmitting module, within an induction recharging assembly for an electric battery, the assembly including a primary module and a secondary module, the primary module including two input terminals capable of receiving an electric current, a primary winding, and a primary capacitor connected to the primary winding and the input terminals, the secondary module including two output terminals, a secondary winding, and a secondary capacitor connected to the secondary winding and the output terminals, the primary winding being configured to induce a current in the secondary winding when the primary winding and the secondary winding are magnetically coupled and a current is received between the input terminals of the primary winding, wherein the secondary module further comprises a secondary switch electrically connected to the secondary capacitor and to the secondary winding, and circuitry configured to control the secondary switch, the secondary switch being able to switch, reversibly, between a first configuration in which the current induced in the secondary winding flows to the output terminals, and a second configuration in which said induced current flows in a closed loop through the secondary winding and the secondary capacitor without being delivered to the output terminals, wherein the primary module further comprises a primary switch electrically connected to the primary capacitor and to the primary winding, and circuitry configured to control the primary switch, the primary switch being able to switch, reversibly, between a third configuration, in which the current induced in the primary winding flows to the input terminals, and a fourth configuration, in which said induced current flows in a closed loop through the primary winding and the primary capacitor without being delivered to the input terminals, wherein the method is carried out by the receiving module chosen from among the primary module and the secondary module and comprises:

generating at least one electric pulse between the terminals of the receiving module, and performing a frequency analysis of an electric signal flowing through the winding of the receiving module following the pulse generated between the terminals of the receiving module, in order to determine the configuration of the switch from among the secondary switch and the primary switch of the transmission module, the transmission module corresponding to the other module among the primary module and the secondary module.

* * * * *

UNITED STATES PATENT AND TRADEMARK OFFICE
CERTIFICATE OF CORRECTION

PATENT NO. : 9,731,612 B2  
APPLICATION NO. : 14/505607  
DATED : August 15, 2017  
INVENTOR(S) : Yann Herriot et al.

Page 1 of 1

It is certified that error appears in the above-identified patent and that said Letters Patent is hereby corrected as shown below:

In the Claims

Column 13, Line 18, before module, change "receiving" to --transmission--

Signed and Sealed this  
Sixteenth Day of April, 2019

Andrei Iancu  
*Director of the United States Patent and Trademark Office*